D. G. LITTLEFIELD.
Stove.
No. 1,478. Reissued May 19, 1863.
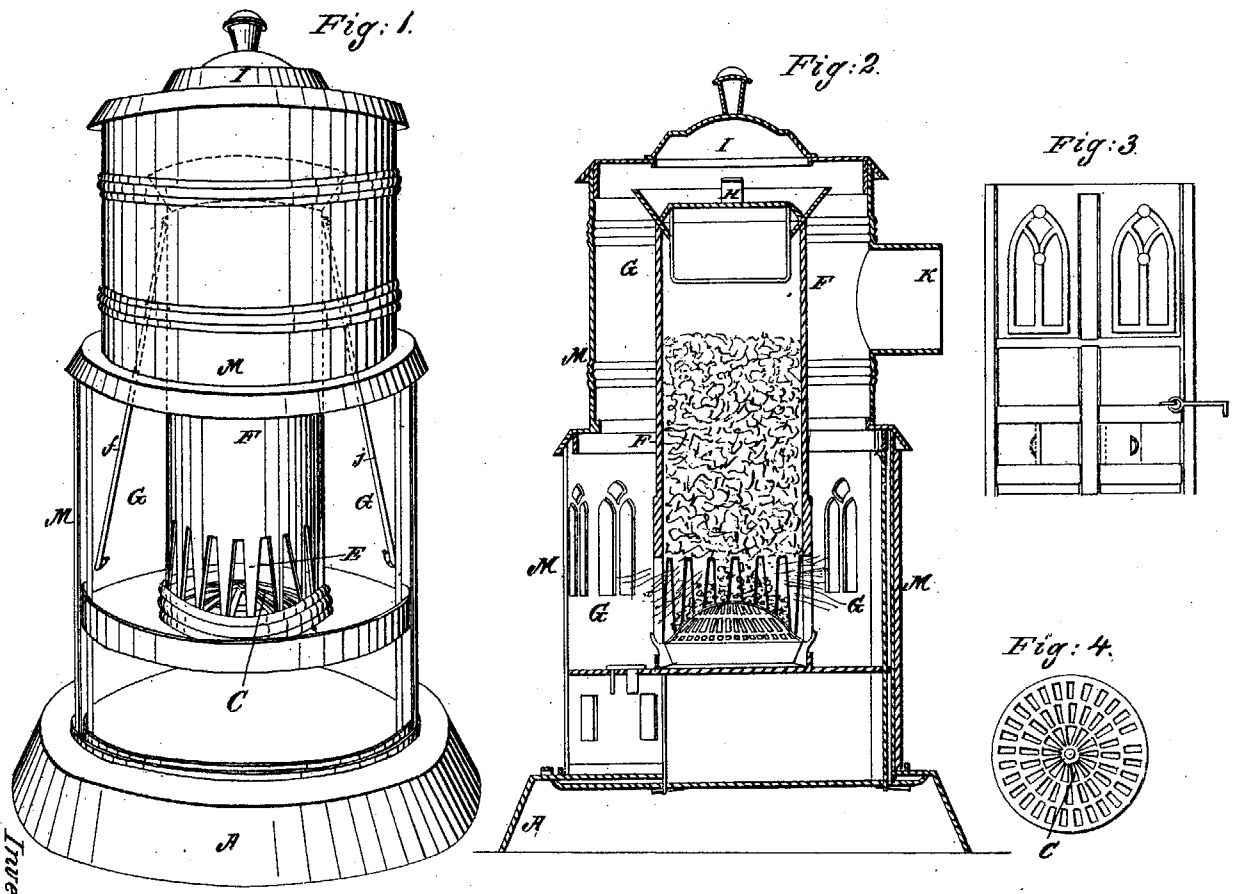
Witnesses:
Gustavus Dieterich
R. L. Cobb
Inventor:
D. G. Littlefield.
by
Dewitt C. Lawrence
Robt W. Fenwick
his Attys.
N. PETERS, Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861; Reissue No. 1,335, dated August 26, 1862; Reissue No. 1,478, dated May 19, 1863.

*To all whom it may concern:*

Be it known that I, DENNIS G. LITTLEFIELD, of the city of Albany, in the county of Albany and State of New York, did, on the 24th day of January, 1854, obtain of and from the United States of America certain Letters Patent for and upon a new method of constructing that class of stoves using a "supplying-cylinder" for reserve coal, which said patent was reissued in two separate divisions or patents on the 19th day of November, 1861, and which last two mentioned patents were again reissued in four divisions on the 26th day of August, 1862; and I do hereby declare that the following is a full and exact description of said invention, reference being had to the accompanying drawings, making part of this specification.

Stoves for burning anthracite and other coals, coke, &c., have been contrived in which a supplying-cylinder for reserve coal has been applied immediately over the fire-pot, in such a position that as the fuel at the base of the mass is consumed that in the supplying-cylinder descends and takes its place. Such a stove can be found in the English patent of Stephen Joyce, enrolled February 21, 1840, and a reference thereto will serve to indicate the distinctive features of my improvements more clearly and forcibly.

In one respect my improved stove and that of Joyce are identical, viz: the supplying-cylinder and the fire-pot upon which it rests are surrounded by a case forming a chamber for the reception of the products of combustion as they issue through the perforations in the fire-pot; but in other respects their constructions differ essentially.

My improvements have reference to three parts of the stove: first, an effectual adaptation of the supplying-cylinder to avoid explosions and permit a more perfect regulation of the stove's operation; second, the construction of an illuminating exterior case to the heating-chamber, that the stove may give light to the apartment, and heat by direct radiation from the fire itself as well as by conduction from its surfaces; and, third, a peculiar construction of the fire-pot, making it more effective in use and less expensive to manufacture.

In the aforesaid stove of Joyce the exterior case inclosed only the sides (more or less) of the supplying-cylinder and the fire-pot, whereas with my improvements it also extends up and surrounds the top as well as the sides of the supplying-cylinder, the advantage of which construction is that no air can pass into said cylinder at the top when the stove is in operation; but whatever air enters in at the cover-opening through the outer casing will necessarily pass immediately to the exit-flue, that being the vacuous space.

It has been found in practice that a supplying-cylinder thus protected may be carried to any height required in order to contain a large quantity of supply-coal without any liability to explosions, or to the fuel becoming ignited above the perforations through the fire-pot, whereas it is unsafe so to construct a supplying-cylinder having the opening for the supply of coal communicate directly with the external atmosphere, as such a construction not only prevents the successful operation of the stove in respect to the amount of coal ignited, but is liable at times, when the coal supplied is wet or of a poor quality, so as to generate hydrogenated gases, to cause explosions, as whenever the air passing up through the bottom grate is partially or wholly cut off the vacuous space of the chimney-flue is unsupplied with its expected current through the regular channel, to meet which deficiency atmospheric air is liable to be drawn in at the cover-opening to such cylinder, though said cover be fitted very perfectly, and this air communicating with the gases therein would cause an explosion, and ultimately the whole mass of supply-coal would become ignited.

Neither in the stove of Joyce nor in any stove with which I am acquainted employing a supplying-cylinder for the reserve fuel and a space or chamber into which the products of combustion and the light and heat from the burning fuel are caused to pass has there been constructed an illuminating exterior case or wall to such space or chamber, thereby permitting the stove to give light to the apartment, and heat by radiation from the fire itself as well as by conduction from the stove's surfaces. The advantage of such construction is of a threefold nature: first, it exposes to view the condition of the fire, whether or not it is operating in a proper manner; second, it permits the fire to burn at a higher temperature without injury to the interior construction, because more heat passing by direct radiation less is retained to act upon those surfaces; and, third, a better quality of heat is furnished, it being well known that radiant heat direct from the fire itself imparts warmth and cheerfulness that cannot be experienced from a heating-surface where there is no light or the cause of such heat is not perceptible to the eye.

In the stove with which I have compared my improved stove the fire-pot was perforated to permit the flame to pass through into a chamber surrounding it, so that the unconsumed gases might be ignited in contact with the burning and partially-consumed coals; but those perforations were so remote from the grate at the bottom, though they were "disposed at regular intervals around the lower part of the frustum" or fire-pot, they being "at two or more different heights above the grate" the gases from the supply-coal would mostly pass out at those apertures or outlets that were most remote from the grate, while the gases from the incandescent coal would pass out at those perforations or outlets below and nearest to the grate, from which imperfect action of the combustion-chamber or fire-pot the partially-consumed coals lying immediately upon the grate were liable to become cool and finally extinguished; whereas with my improved construction, having the perforations or outlets extend perpendicularly from near the grate upward as high as it is desirable to ignite the coal, the gases from the supply-coal and also from the incandescent coal are burned in conjunction and entirely down to the bottom, thereby aiding in the combustion of the refractory and partially-consumed coals at that point. The form of the perforations or outlets, though not absolutely essential, is important. It not only facilitates the manufacture but adds to the successful operation of the stove, inasmuch as the flame of the burning gases is thereby brought lower than would be the case if the perforations were widest or were of the same width at the top.

To effect the two first-named purposes is to remedy positive defects; but the last-named purposes may be regarded as improvements. All, however, if effected, are useful and desirable.

To enable those skilled in the art to carry my invention into practice, I will now proceed to describe the construction of a stove (shown in the accompanying drawings) which combines these improvements.

Figure 1 is a view of a cylindrical stove, a part of the outer cylinder being removed. Fig. 2 is a central vertical section of the same, showing the arrangement of the various parts of the stove herein described.

Like letters represent and refer to like or corresponding parts in both figures.

A is the base of the stove, immediately above which is the ash-pit B.

D is the bed-plate, which forms the floor of a chamber, G, having a cylindrical opening in the center, whereon is placed the fire-pot E, which rests upon a ring, O. This ring has a flange projecting up a short distance outside of the lower part of the fire-pot to keep the same in place, and itself rests upon the bed-plate D within a flange to keep it in place. This ring should be about twice the depth of the average diameter of the coal to be burned, and consequently varies with the size thereof. The fire-pot is so perforated as to form open spaces *c c* of a peculiar form, the portions remaining being in the form of bars *b b*, which are wider at the top than at the bottom, so that the perforations or outlets *c c* between them are widest at the bottom. This form of the perforations or outlets from the fire-pot tends to draw the flame of the burning gases lower down, and thereby cause the hottest part of the fire to be at the bottom of the coal. The height of the perforations or outlets *c c* should be proportioned to the diameter of the fire-pot, (about one-half thereof,) for should they exceed a certain limit the coal at the base would be too far from the influence of the burning gases, which tend to pass through the upper part of the perforations or outlets, and thus one object of this improvement be defeated. The grate at the bottom of this fire-pot rests upon the bed-plate D on a line with the bottom of the ring O, and may be made in the form represented, or of such other form as will answer the purpose.

F is the supplying-cylinder, which is placed immediately over and upon the top of the fire-pot E, to which it is accurately fitted and held in place by rods *j j*, Fig. 1. It has a cover, H, which is to be kept closed when the stove is in operation. This supplying-cylinder extends up nearly to the top of the stove, so as to contain a large quantity of supply-coal in order to introduce a supply at once that may be sufficient to last for a considerable time and permit the stove to be regulated in its action entirely by the amount of air permitted to pass up through the bottom grate.

So far as to the reserve coal, the advantage to be gained is identical with that of Joyce, and is properly described by a quotation from his specification, which is as follows, viz: "As that said upper portion of the fuel rests with all its weight immediately upon the burning fuel contained in the lower part of the frustum beneath the level of the apertures," (perforations or outlets *c c*,) "the heat of the burning fuel will ascend so much as to render the fuel hot before it descends below the level of the apertures and begins to burn with an active combustion, and the fuel being thus heated before it is required to begin to burn it is thereby better prepared for burning than cold fuel would be." Surrounding the above-described fire-pot and supplying-cylinder is an exterior casing, M M, which forms the chamber G, extending up and entirely surrounding the top of the supplying-cylinder as well as the sides. It has openings *f f* around its whole periphery, glazed with mica, (or isinglass,) thereby producing an illuminating-chamber; and thus when the stove is in operation it presents the cheerful appearance of an open fire. There should be great care in constructing these illuminating-spaces so that no air can pass into said chamber through them, since the air, if thus admitted, not only would counteract the current passing up from the ash-pit to support combustion within the fire-pot, but it would also cool the stove by mixing with the heated products of combustion and reducing their temperature. There may be doors, one of which is shown at Fig. 3, opening into chamber G, if thought best, in practical use, and these may be provided with windows or illuminating-apertures. There is a cover, L, at the top of said chamber, which is to be removed when the supplying-cylinder requires replenishing.

K is the exit-flue which leads to the smoke-pipe, and may be placed at the side near the top, as shown in the drawings, or at such other point as may be preferred.

I will now proceed to describe the operation of a stove combining these improvements. The fire is kindled within the fire-pot E, having the cover H open, so as to permit the smoke to pass up the supplying-cylinder and avoid smoking the windows *f f* while igniting the kindlings. The said kindlings may be permitted to burn in this manner for a short time, or until the smoke shall have passed off and they are thoroughly ignited, when the supplying-cylinder may be filled with coal and the cover H closed. As combustion takes place all the coal within the fire-pot up to a point just above the perforations or outlets *c c* becomes ignited. The gases and products of imperfect combustion which are collected within the supplying-cylinder and the fire-pot are compelled to pass therefrom in an ignited state at said perforations or outlets *c c*, aiding thereby in keeping up a vivid combustion at those perforations, which, extending down nearly to the grate, and being widest at the bottom, aid in the combustion of the incandescent coal upon said grate. The light emanating from the combustion illuminates the chamber G, and is reflected therefrom through the windows or illuminating-spaces of the exterior case, which, thus transmitting the light, becomes an illuminating-case. The products of combustion and of the gases thus utilized pass up the chamber G, which surrounds the top and sides of the supplying-cylinder, so that they are free to pass over said cylinder on their course to the exit-flue K, which, tending to empty the chamber G, any air that may enter said chamber at the top cover, I, will pass at once to the exit-flue K, and will not enter the supplying-cylinder at all when the stove is in operation.

What I claim as my invention, and desire to secure by Letters Patent, is—

The combination of the fire-pot E, having vertical openings *c c*, with the supplying-cylinder F, when the same are immersed within the outer cylinder, M, which forms the chamber G and G′, substantially as and for the purpose herein described.

DENNIS G. LITTLEFIELD.

Witnesses:

HENRY C. LITTLEFIELD,

P. L. GILBERT.